No. 674,809. Patented May 21, 1901.
S. O. COWPER-COLES.
PROCESS OF TREATING ZINC BEARING ORES FOR OBTAINING ZINC, &c.
(Application filed July 23, 1898.)
(No Model.)
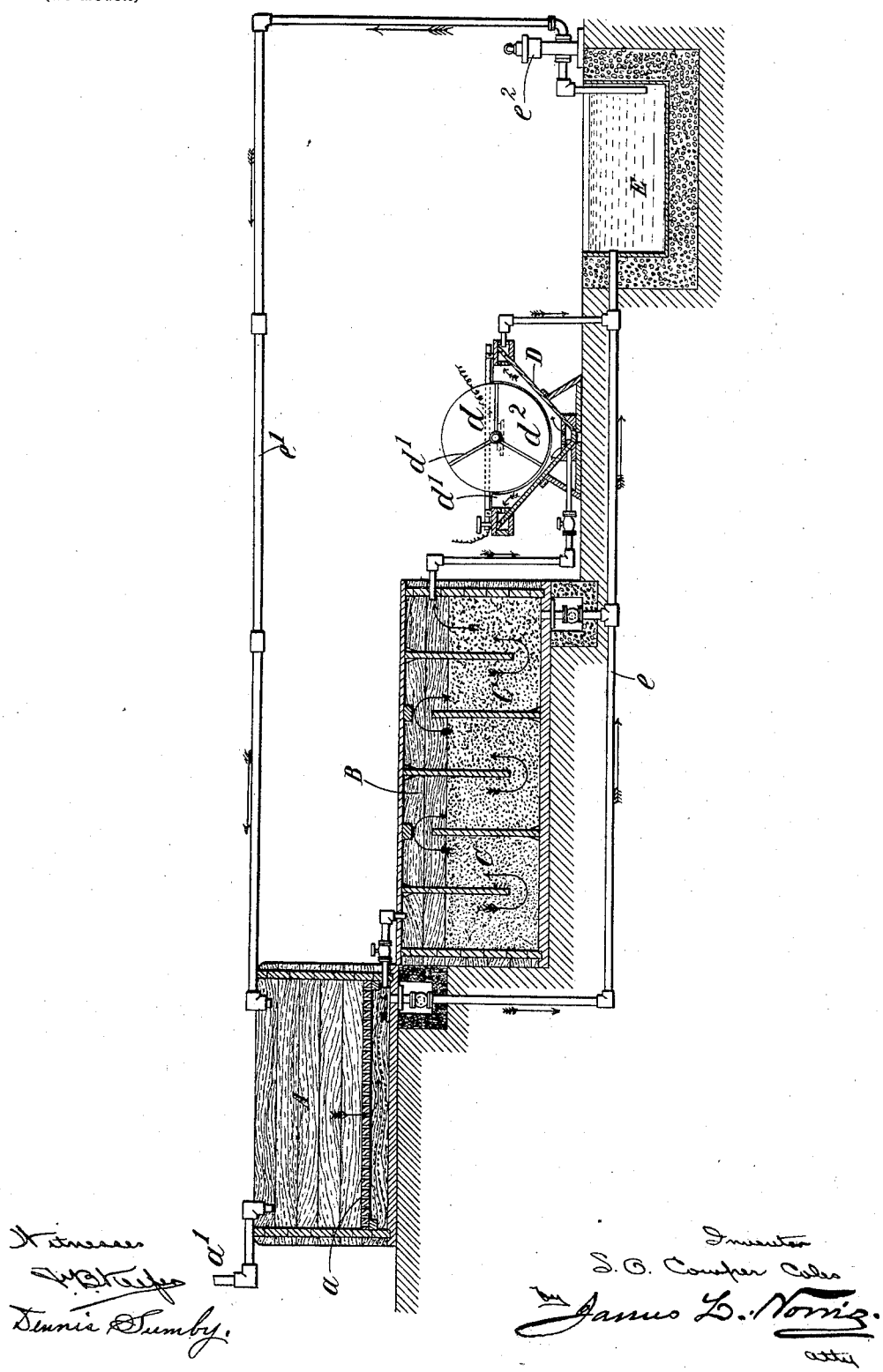

UNITED STATES PATENT OFFICE.

SHERARD OSBORN COWPER-COLES, OF LONDON, ENGLAND, ASSIGNOR TO THE COWPER-COLES METAL EXTRACTION SYNDICATE, LIMITED, OF MELLANEAR HAEYLE, ENGLAND.

PROCESS OF TREATING ZINC-BEARING ORES FOR OBTAINING ZINC, &c.

SPECIFICATION forming part of Letters Patent No. 674,809, dated May 21, 1901.

Application filed July 23, 1898. Serial No. 686,691. (No specimens.)

*To all whom it may concern:*

Be it known that I, SHERARD OSBORN COWPER-COLES, engineer, a subject of the Queen of Great Britain, residing at 39 Victoria street, London, England, have invented certain new and useful Improvements in the Treatment of Zinc-Bearing Ores for Obtaining Zinc and other Metals Therefrom, of which the following is a specification.

This invention relates to the treatment of zinc-bearing ores for obtaining therefrom zinc and other metals they contain.

The object of my invention is to provide a new and improved process for the purpose stated, as hereinafter described and claimed, reference being made to the accompanying drawing, in which the figure is a longitudinal vertical sectional view of apparatus suitable for carrying my invention into effect.

Hitherto the attempts that have been made to extract the metals from these ores, especially when they are of a complex character, have not been satisfactory, a large percentage of the metals being lost during the treatment of the ores.

It is the chief object of this invention to provide a process whereby the metals can be recovered from the ores without the great loss which has been incidental to processes hitherto used. The said process is especially applicable to the treatment of sulfid ores of the kind obtained from Broken Hill, (which generally contain zinc, lead, silver, and a small quantity of gold,) but is nevertheless also applicable to the treatment of zinc-bearing ores generally—such, for example, as zinc-blende, which sometimes contains, in addition to the zinc, varying quantities of lead or copper, or both.

According to my invention the ore is first crushed to such a condition that it will pass through a sieve of about thirteen hundred meshes to the square inch. It is then heated to a "dead-roast" in any suitable furnace, so as to convert the zinc sulfid into zinc sulfate or zinc oxid, or both. To facilitate this roasting, I add from twenty-five per cent. to fifty per cent. of zinc-blende to prevent the adhesion of the particles of the ore and enable an effectual dead-roast to be obtained—that is to say, the zinc-blende is employed to keep the ore under treatment open or porous and prevent it becoming pasty or sticky during the roasting operation. I may use any other ore which will accomplish this result and which will be soluble in the solution subsequently employed, as hereinafter set forth. Such other ore to facilitate roasting the ore under treatment may consist of copper-sulfid ore or tin ore or the tailings thereof. I prefer the zinc-blende in that it is more economical in working my process. An ore such as that obtained at Broken Hill is roasted with difficulty, due to the quantity of lead it contains. The ore when treated becomes pasty or sticky and the sulfur does not readily burn off. During the roasting the ore is kept constantly stirred, for which purpose a hollow rake, through which air is blown, can be used with advantage.

After the ore has been roasted, as above explained, it is placed in a reciprocating or revolving screen to separate the fine dusty portion therefrom. The portion of the ore that passes through the screen is placed in one series of leaching-vats and the fine dusty portion in another series of leaching-vats, so that each portion can be independently treated by my process. A centrifugal fan or other appropriate device may be provided for removing the fine dusty portion and depositing it into the slime leaching-vats. The coarse portion of the ore resulting from the screening operation is recrushed and reroasted and again screened. The leaching-vats, as at A, into which the screened ore is placed, are provided with false bottoms *a*, covered with filtering-cloths or the like to form a filter-bed. The ore having been placed in the vats, I then proceed to treat it with various leaching solutions for removing the metals. I commence with a weak solution of sulfuric acid containing not more than one ounce of free sulfuric acid to each gallon of water. This solution is admitted to the leaching-vats from suitable elevated tanks through a pipe *a'*, the acid in the solution combining with the oxids of the zinc and the copper to form sulfates. While this leaching operation is proceeding and in order to hasten the process a current of electricity may be passed through the mass of ore in the vats, for which purpose I may employ an insoluble anode, placed beneath the ore, and a zinc cathode, surrounded by a porous protector, placed above the ore. This solution after passing through the ore contains zinc sulfate, copper sulfate, and a little or no free acid and is allowed to flow from the space beneath the filter-bed of the leaching-vats to an epuration-vat B, wherein it is caused to flow through a body or bed C, composed of fragments of carbon and an electropositive metal, such as zinc or iron. As the solution passes slowly through such body or bed it deposits thereon the copper it contains, which is subsequently recovered by any appropriate operation.

The aforesaid leaching solution is passed a number of times through the vats containing the ore, fresh sulfuric acid being added thereto in the small quantities already mentioned each time it is returned to the vats until the solution contains approximately one ounce of free sulfuric acid and from twenty to thirty ounces of zinc sulfate to each gallon of water. In thus repassing the leaching solution through the vats A and B, I permit it to flow from the epuration-vat through the discharge-pipe $e$ to the sump E, from whence it is forced by a pump $e^2$ and pipe $e'$ back to the vat A. When the solution has attained the aforesaid strength and has been freed from the copper it contains, as described above, it is then electrolytically treated in electrolyzing-cells, as at D. These cells are provided with cathodes composed of vertically-revolving cast-iron disks $d$ and with anodes composed of lead plates $d'$. The iron disks are slowly rotated during the electrolytic action and are provided with fillets $d^2$, of wood, which can be detached to allow of the removal of the deposited zinc in the form of segments when such zinc has attained the desired degree of thickness. The current density employed varies from fifteen to twenty amperes per square foot, a convenient voltage at the terminals of the electricity-generator being from one hundred to one hundred and fifty volts and at the terminals of the cells from one to two volts.

Instead of zinc plates zinc-dust can be readily and economically obtained by varying the chemical or electrical conditions, or both, so that the zinc is deposited in a spongy form on the revolving cathodes and removed by scrapers placed against the face thereof.

The aforesaid zinc-sulfate solution after being electrolytically treated to remove the zinc therefrom and after its strength has been adjusted to the requisite strength of one ounce of sulfuric acid to each gallon of water, as aforesaid, is then returned to a suitable tank or chamber ready for leaching another charge of the ore.

In order to obtain an economical extraction of zinc from the ore, it is advisable either before or after the aforesaid leaching has been effected, or both before and after such leaching, to thoroughly wash out with preferably hot water the soluble zinc salts that may exist or remain in the mass of ore in the leaching-vats. This weak wash should not be passed into the electrolytic cells containing the zinc-sulfate solution, as it would dilute the latter too much, and therefore I prefer that it should be conducted to an evaporating-pan, which is heated by the waste heat from the roasting-furnace or otherwise. The zinc sulfate thus obtained in the evaporating-pan can be treated by any suitable process for the production of zinc-white therefrom. By avoiding the mixture of the aforesaid weak wash with the main body of the leaching solution in the electrolytic cells I prevent the too-rapid accumulation of manganese and other undesirable impurities in the electrolyte.

The ore in the vats having by the above-described treatment been freed of most of the zinc and copper it contains is now further leached with a solution containing about thirty ounces of caustic soda to each gallon of water. This solution is passed a number of times through the ore in the leaching-vats and takes up the lead which such ore contains. The resulting sodium-plumbate solution is then passed into an electrolyzing-cell and electrolytically treated to deposit the lead.

The repeated use of the solution for leaching out the lead from the ore causes it to become partly converted into silicate and carbonate of soda. I therefore add freshly-burned lime to the said solution or to the ore in sufficient quantities to re-form caustic soda, care being taken not to add too much lime.

The sodium-plumbate solution instead of being electrolytically treated, as aforesaid, may be treated for the production of white lead by conducting it to a receiver or chamber to which carbonic-acid gas is supplied under pressure, whereby the lead is converted into lead carbonate and hydrate and the caustic soda into carbonate of soda. The carbonate of soda may be used for converting the zinc in the sulfate solution resulting from the first leaching treatment of the ore into zinc carbonate, which is subsequently converted into zinc-white by the application of heat. The ore in the leaching-vats having now been freed of its lead as well as its zinc and copper is then treated in any well-known manner with cyanid-of-potassium solution, and this solution is then subjected to any ordinary or well-known process or method of electrolysis to remove the silver and any gold that may be present in the ore.

The aforesaid fine dusty portion or tailings of the ore are treated in an analogous manner to that already described with respect to the other portion of the ore, except that, as already stated, they are treated separately and in vats specially provided for them.

I claim—

1. A process for the treatment of complex zinc ores, such as those known as "Broken Hill" ore, consisting in crushing, screening and roasting the ore, then placing it in leaching-vats, then treating it with a weak solution of sulfuric acid to abstract the zinc and copper, then passing such solution containing zinc sulfate and copper sulfate through a body of carbon and an electropositive metal to recover the copper, and then electrolyzing the remaining solution to recover the zinc substantially as described.

2. A process for the treatment of complex zinc ores, such as those known as "Broken Hill" ore, consisting in mixing with the said ore prior to the roasting a quantity of zinc-blende, copper-sulfid ore, or tin ore or tailings thereof, then roasting it to a "dead-roast," then crushing and screening it then placing it in vats where it is leached with a weak solution of sulfuric acid to abstract the zinc and copper, then passing such solution containing zinc sulfate and copper sulfate through a body of carbon and an electropositive metal to recover the copper, and then electrolyzing the remaining solution to recover the zinc; the said leaching solution after its strength has been adjusted, being returned to the leaching-vats for use over again substantially as described.

3. A process for the treatment of complex zinc ores, such as those known as "Broken Hill" ore, consisting in first roasting, crushing and screening the ore, then placing it in vats and washing the ore with water, then leaching the ore with a weak solution of sulfuric acid to abstract the zinc and copper, then passing such solution containing zinc sulfate and copper sulfate through a body of carbon and an electropositive metal to recover the copper, then electrolyzing the remaining solution to recover the zinc, then again washing the ore with water, then treating the ore with a solution of caustic soda to extract the lead in the form of sodium plumbate, and then electrolyzing the solution to recover the metallic lead substantially as described.

4. A process for the treatment of complex zinc ores, such as those known as "Broken Hill" ore, consisting in first roasting, crushing and screening the ore, then placing it in vats and washing the ore with water which is afterward run into an evaporating-pan, then leaching the ore with a weak solution of sulfuric acid to abstract the zinc and copper, then passing such solution containing zinc sulfate and copper sulfate through a body of carbon and an electropositive metal to recover the copper, then electrolyzing the remaining solution to recover the zinc, then again washing the ore with water which is afterward also run into the evaporating-pan, then treating the ore with a solution of caustic soda to extract the lead in the form of sodium plumbate, then electrolyzing the solution to recover the metallic lead, and then leaching the remaining ore in the vats with potassium cyanid and subsequently electrolyzing such solution to recover the metallic silver and gold substantially as described.

5. A process for the treatment of complex zinc ores consisting in crushing and screening the ore, then admixing therewith an ore which acts to maintain the complex ore open and porous and prevent it becoming pasty or sticky during roasting, then roasting the ore, then placing it in leaching-vats, then treating it with a weak solution of sulfuric acid to abstract the zinc and copper, then passing the solution containing zinc and copper sulfates through a body of carbon and an electropositive metal to recover the copper, and then electrolyzing the remaining solution to recover the zinc, substantially as described.

6. A process for the treatment of complex zinc ores consisting in crushing and screening the ore, then admixing zinc-blende therewith, then roasting the ore, then placing it in leaching-vats, then treating it with a weak solution of sulfuric acid to abstract the zinc and copper, then passing the solution containing zinc and copper sulfates through a body of carbon and an electropositive metal to recover the copper, and then electrolyzing the remaining solution to recover the zinc, substantially as described.

In testimony whereof I have hereunto set my hand, in presence of two subscribing witnesses, this 7th day of July, 1898.

SHERARD OSBORN COWPER-COLES.

Witnesses:
  F. W. McLELLAN,
  FRED C. HARRIS.